United States Patent
Khangar

(10) Patent No.: US 11,566,879 B2
(45) Date of Patent: Jan. 31, 2023

(54) TAPE MEASURE WITH TEAR RESISTANT TAPE BLADE EDGE

(71) Applicant: Milwaukee Electric Tool Corporation, Brookfield, WI (US)

(72) Inventor: Abhijeet A. Khangar, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/730,890

(22) Filed: Apr. 27, 2022

(65) Prior Publication Data
US 2022/0252383 A1  Aug. 11, 2022

Related U.S. Application Data

(63) Continuation of application No. 16/991,340, filed on Aug. 12, 2020, now Pat. No. 11,340,054, which is a continuation of application No. PCT/US2019/017681, filed on Feb. 12, 2019.

(60) Provisional application No. 62/629,924, filed on Feb. 13, 2018.

(51) Int. Cl.
G01B 3/1003 (2020.01)

(52) U.S. Cl.
CPC ............. G01B 3/1003 (2020.01)

(58) Field of Classification Search
CPC ...... G01B 3/1003; G01B 1/00; G01B 3/1056; G01B 2003/1053; G01B 2003/1076; G01B 3/1041; G01B 3/10
See application file for complete search history.

(56) References Cited

U.S. PATENT DOCUMENTS

| | | | |
|---|---|---|---|
| 3,986,301 A | 10/1976 | Lough et al. | |
| 4,411,072 A | 10/1983 | Rutty et al. | |
| 4,429,462 A | 2/1984 | Rutty et al. | |
| 5,497,817 A | 3/1996 | Ikegami | |
| 5,739,438 A | 4/1998 | Sawada et al. | |
| 6,804,899 B2 * | 10/2004 | Murray | G01B 3/10 33/771 |
| 8,584,373 B2 * | 11/2013 | Murray | G01B 3/1003 33/771 |
| 9,290,832 B2 | 3/2016 | Junius et al. | |

(Continued)

FOREIGN PATENT DOCUMENTS

| | | |
|---|---|---|
| CN | 2319778 Y | 5/1999 |
| CN | 1714172 A | 12/2005 |

(Continued)

OTHER PUBLICATIONS

International Search Report and Written Opinion for International Application No. PCT/US2019/017681, dated Jun. 3, 2019, 14 pages.

*Primary Examiner* — Yaritza Guadalupe-McCall
(74) *Attorney, Agent, or Firm* — Reinhart Boerner Van Deuren s.c.

(57) ABSTRACT

A tape measure including a tape measure blade having an edge design to increase tape blade durability is provided. The metal portion of the tape blade may include lateral edge surface sections that have a non-planar, tear reducing shape. The metal portion of the tape blade may include lateral edge surface sections that include a tear reducing surface treatment such as a polished lateral edge surface section.

20 Claims, 7 Drawing Sheets

(56) References Cited

U.S. PATENT DOCUMENTS

| | | | | |
|---|---|---|---|---|
| 10,126,107 B2* | 11/2018 | Khangar | .............. | G01B 3/1056 |
| 10,746,521 B2* | 8/2020 | Khangar | .............. | G01B 3/1056 |
| 11,199,390 B2* | 12/2021 | Khangar | .............. | G01B 3/1003 |
| 11,340,054 B2* | 5/2022 | Khangar | .............. | G01B 3/1003 |
| 2004/0071869 A1* | 4/2004 | Gilliam | .................. | C23C 24/10 |
| | | | | 427/458 |
| 2006/0240195 A1* | 10/2006 | Gilliam | .................. | C23C 26/02 |
| | | | | 427/591 |
| 2007/0079520 A1 | 4/2007 | Levine et al. | | |
| 2013/0067759 A1* | 3/2013 | Murray | ................ | G01B 3/1003 |
| | | | | 33/761 |
| 2018/0195847 A1* | 7/2018 | Khangar | .................. | G01B 1/00 |
| 2019/0277612 A1* | 9/2019 | Khangar | .............. | G01B 3/1003 |
| 2020/0370873 A1* | 11/2020 | Khangar | .............. | G01B 3/1003 |
| 2020/0370874 A1* | 11/2020 | Khangar | .............. | G01B 3/1056 |
| 2021/0072010 A1* | 3/2021 | Khangar | .............. | G01B 3/1007 |
| 2022/0252383 A1* | 8/2022 | Khangar | .............. | G01B 3/1003 |

FOREIGN PATENT DOCUMENTS

| | | | |
|---|---|---|---|
| CN | 1760628 | A | 4/2006 |
| CN | 102994904 | | 3/2013 |
| CN | 104032228 | | 9/2014 |
| CN | 104165558 | A | 11/2014 |
| CN | 204912274 | | 12/2015 |
| DE | 2318789 | | 10/1974 |
| DE | 4317819 | | 10/1997 |
| EP | 0025570 | | 3/1981 |
| GB | 529277 | A | 11/1940 |
| JP | 06-213602 | | 8/1994 |
| KR | 200415068 | | 4/2006 |
| TW | 200508570 | A | 3/2005 |

* cited by examiner

TAPE MEASURE WITH TEAR RESISTANT TAPE BLADE EDGE

CROSS-REFERENCE TO RELATED PATENT APPLICATIONS

The present application is a continuation of U.S. application Ser. No. 16/991,340, filed Aug. 12, 2020, which is a continuation of International Application No. PCT/US2019/017681, filed Feb. 12, 2019, which claims the benefit of and priority to U.S. Provisional Application No. 62/629,924, filed on Feb. 13, 2018, which are incorporated herein by reference in their entireties.

BACKGROUND OF THE INVENTION

The present invention relates generally to the field of tools. The present invention relates specifically to a tape measure, measuring tape, retractable rule, etc., that includes a tape measure blade with an edge design that increases strength and/or resists tearing.

Tape measures are measurement tools used for a variety of measurement applications, including in the building and construction trades. Some tape measures include a graduated, marked blade wound on a reel and also include a retraction system for automatically retracting the blade onto the reel. In some such tape measure designs, the retraction system is driven by a coil or spiral spring that is tensioned, storing energy as the tape is extended, and that releases energy to spin the reel, winding the blade back onto the reel such that automatic or non-manual tape retraction is provided. In some other tape measure designs, retraction of the tape is controlled via a manual crank, and such tape measure blades tend to have a long length.

SUMMARY OF THE INVENTION

One embodiment of the invention relates to a tape measure including a tape blade having edges designed or configured to increase durability and/or decrease tearing. In a specific embodiment, the tape blade has an upper concave surface, a lower convex surface, a first lateral edge surface extending between the left ends of the upper concave surface and the lower convex surface, and a second lateral edge surface extending between the right ends of the upper concave surface and the lower convex surface. The first and second lateral edge surfaces are designed to improve durability and/or reduce tearing. In one embodiment, the first and second lateral edge surfaces are outwardly extending convex curved surfaces, and specifically are continuous, convex curved surfaces extending between the upper and lower surfaces. In various embodiments, the first and second lateral edge surfaces are polished or otherwise finished to reduce the number and/or size of surface defects.

Another embodiment of the invention relates to a tape measure. The tape measure includes a housing, a reel rotatably mounted within the housing and an elongate blade wound around the reel. The elongate blade includes an elongate metal core having an upper surface, a lower surface, a first lateral edge surface extending between the upper and lower surfaces of the elongate metal core and a second lateral edge surface opposite the first lateral edge surface and extending between the upper and lower surfaces of the elongate metal core. The elongate blade includes a polymer coating coupled to the elongate metal core. The upper surface of the elongate metal core includes a concave curved section. The lower surface of the elongate metal core includes a convex curved section. The first lateral edge surface includes a convex curved section. The second lateral edge surface includes a convex curved section. The tape measure includes a retraction mechanism coupled to the reel configured to drive rewinding of the elongate blade on to the reel and a hook assembly coupled to an outer end of the elongate blade.

Another embodiment of the invention relates to a tape measure. The tape measure includes a housing, a reel rotatably mounted within the housing and an elongate tape measure blade wound around the reel. The elongate tape measure blade including an upper surface, a lower surface, a first metal lateral edge surface extending between the upper and lower surfaces of the elongate tape measure blade and a second metal lateral edge surface opposite the first metal lateral edge surface and extending between the upper and lower surfaces of the elongate tape measure blade. The first metal lateral edge surface includes a shaped, non-planar surface section. The second metal lateral edge surface includes a shaped, non-planar surface section. The tape measure includes a retraction mechanism coupled to the reel configured to drive rewinding of the elongate tape measure blade on to the reel.

Another embodiment of the invention relates to a tape measure. The tape measure includes a housing, a reel rotatably mounted within the housing and an elongate tape measure blade wound around the reel comprising an elongate metal core. The elongate metal core includes an upper surface, a lower surface, a first lateral edge surface extending between the upper and lower surfaces of the elongate metal core and a second lateral edge surface opposite the first lateral edge surface and extending between the upper and lower surfaces of the elongate metal core. The first lateral edge surface includes a polished section such that an average number of surface defects per $mm^2$ within the polished section is less than an average number of surface defects per $mm^2$ of the upper surface of the elongate metal core. The second lateral edge surface includes a polished section such that an average number of surface defects per $mm^2$ within the polished section is less than an average number of surface defects per $mm^2$ of the upper surface of the elongate metal core. The tape measure includes a retraction mechanism coupled to the reel configured to drive rewinding of the elongate tape measure blade on to the reel.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various embodiments of a tape measure are shown. Various embodiments of the tape measure discussed herein include an innovative tape blade edge design that Applicant believes improves tape blade strength, durability and/or tear resistance. As will be generally understood, one of the common modes of tape blade breakage is tearing during tape retraction. In general, when the tape blade retracts, the tape blade can whip back toward the user, cinching the blade repeatedly at a single location.

Figure 7:
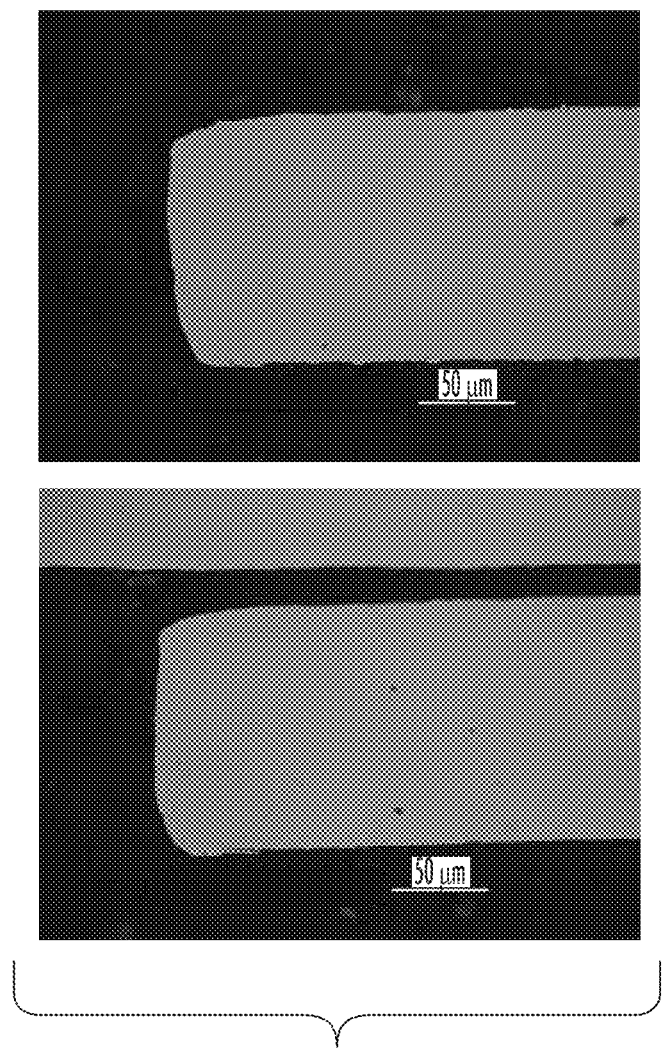
FIG. 7 is a cross-sectional micrograph image of the inner metal layer of a tape blade showing a conventional edge design.
Figure 8:
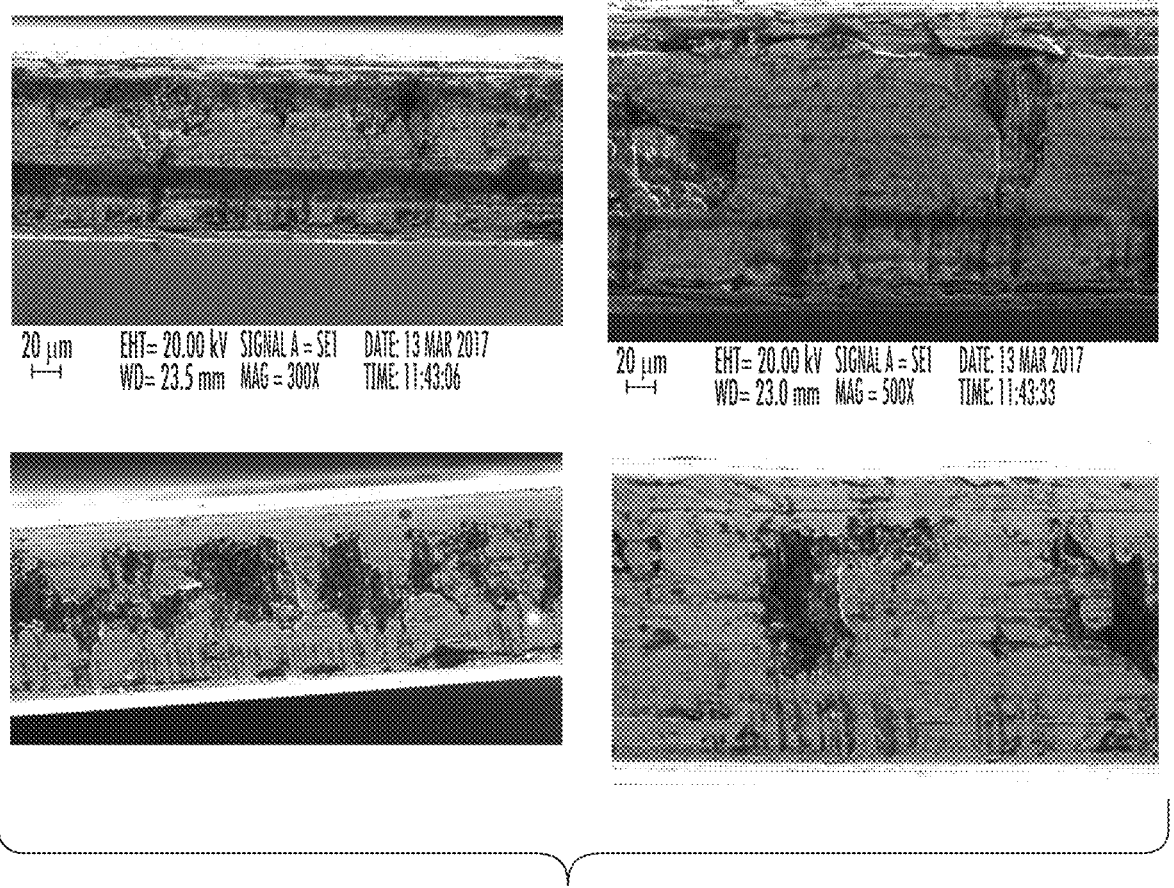
FIG. 8 shows micrograph images of a tape blade edge surface having a tear resistant edge design.

In general, Applicant hypothesizes that the square/flat edges (see FIG. 7) of typical blades have imperfections (see FIG. 8) that facilitate tearing of the blade during retracting. Applicant hypothesizes that the tear initiates at the imperfection(s) during retraction and continues on into the center portion of the blade. For example, when the blade whips back and cinches at a point along the tape blade, an imperfection at that point on the blade causes stress concentration that causes initiation of blade tear. Accordingly, as discussed in detail below, Applicant has developed a variety of tape blade edge surface designs and/or surface finishes that Applicant believes will decrease tear initiation during whip, and thereby will improve tape blade strength, durability and/or tear resistance. Applicant believes that due to the technical difficulty and cost associated with profiling/finishing the lateral edges of the tape blade material, the edge designs discussed herein are counterintuitive and contrary to conventional understanding in the field of tape measure design.

Figure 1:
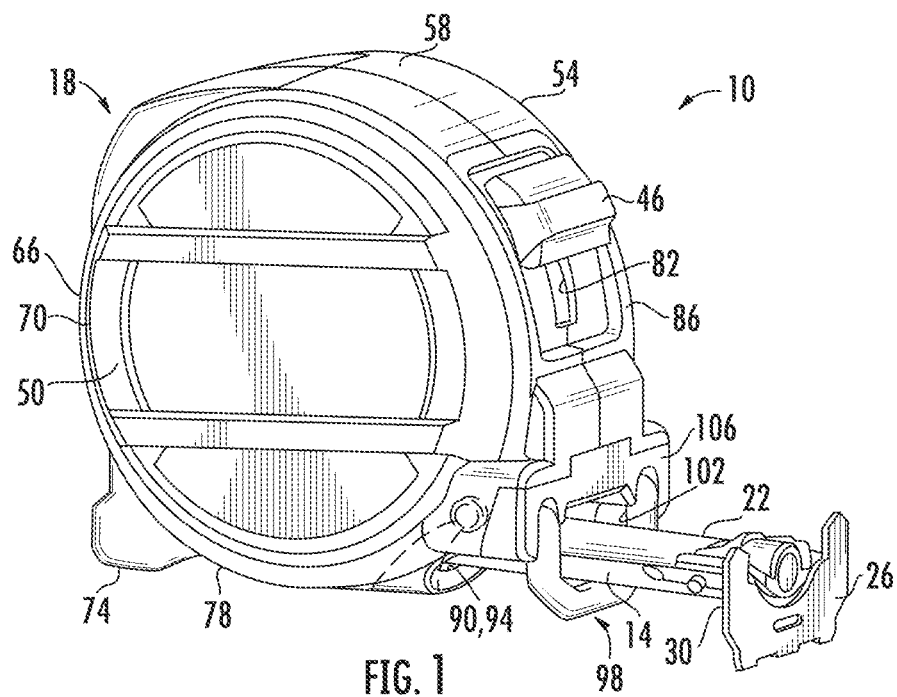
FIG. 1 is a left side perspective view of a tape measure, according to an exemplary embodiment.
Figure 2:
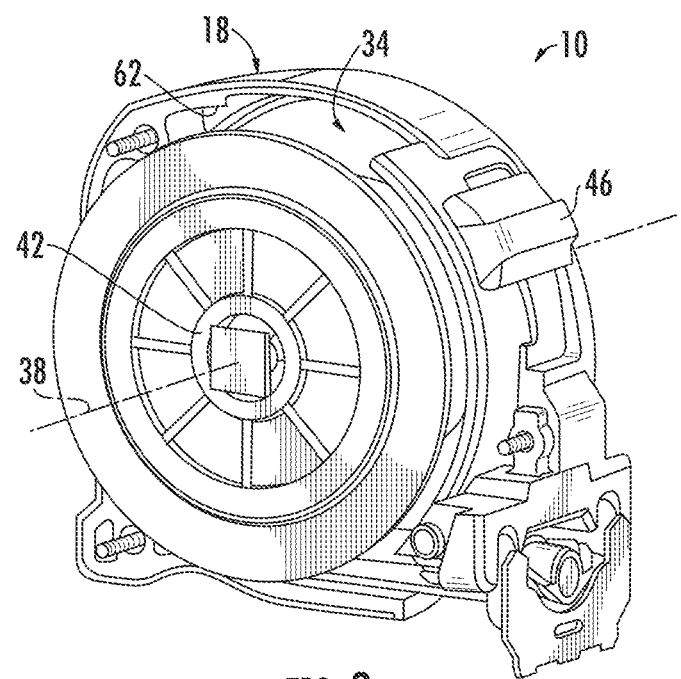
FIG. 2 is a left side perspective view of the tape measure of FIG. 1 with a portion of the tape measure housing removed, according to an exemplary embodiment.
Figure 3:
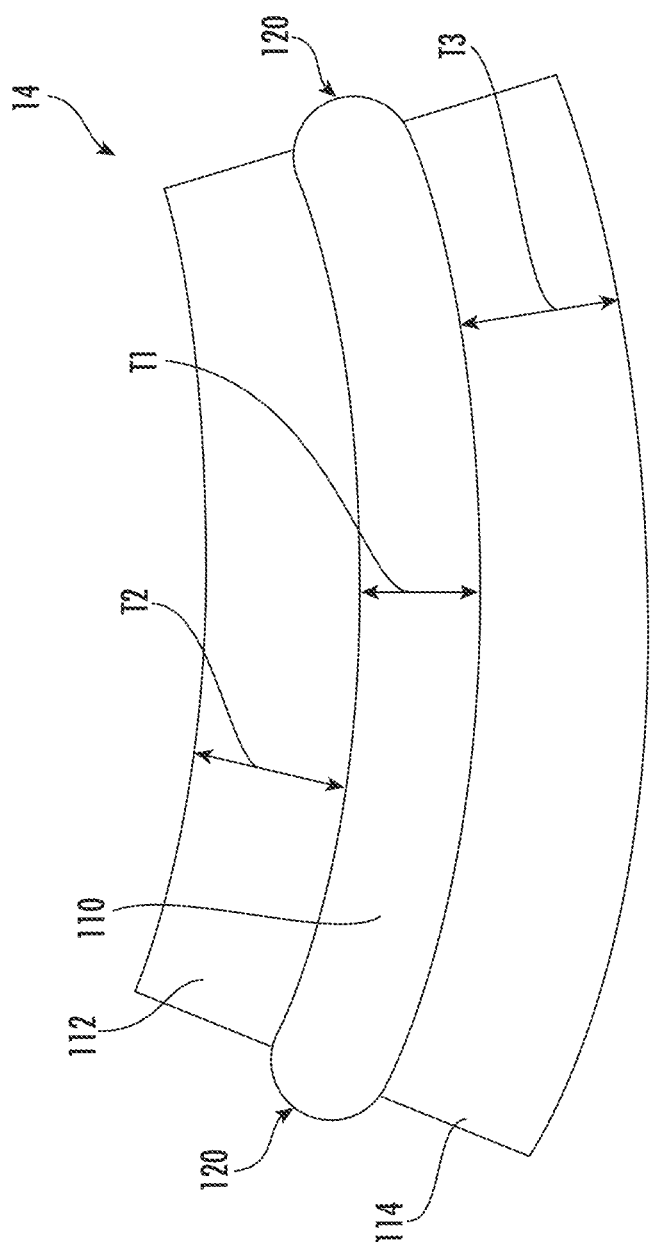
FIG. 3 is a cross-sectional view of a polymer coated tape blade of the tape measure of FIG. 1, according to an exemplary embodiment.

Referring to FIG. 1 and FIG. 2, a length measurement device, such as tape measure 10, is shown according to an exemplary embodiment. Tape measure 10 includes an elongate blade, shown as coilable tape blade 14, and a housing 18. In general, tape blade 14 is an elongate strip of material including a plurality of graduated measurement markings, and in specific embodiments, tape blade 14 is an elongate strip of metal material (e.g., steel material) that includes an outermost end coupled to a hook assembly, shown as hook assembly 26. As shown in FIG. 3, tape blade 14 may include one or more polymer layers (e.g., polymer coating layers) to help protect tape blade 14 from cracking during whip or pinch.

As shown in FIG. 1, a variable-length extended segment 22 of the tape blade 14 is retractable and extendable from the housing 18. A hook assembly 26 is fixedly coupled to an outer end portion 30 of tape blade 14. As will be discussed in more detail below, in various embodiments, tape blade 14 includes an edge surface and/or surface finish that improves tape blade durability.

As shown in FIG. 2, the non-extended portion of tape blade 14 is wound onto a reel 34, which is surrounded by housing 18. Reel 34 is rotatably disposed about an axis 38 of tape measure 10, and a retraction mechanism 42 is coupled to reel 34 and configured to drive reel 34 about rotation axis 38 which in turn provides powered retraction of tape blade 14. Retraction mechanism 42 may include one or more elongated spiral springs that provides the retraction energy to retraction mechanism 42. In other embodiments, the retraction mechanism includes an electronic motor. A tape lock 46 is provided to selectively engage tape blade 14, which acts to restrain retraction mechanism 42 such that extended segment 22 of tape blade 14 remains at a desired length.

Referring to FIG. 1, housing 18 includes a first side wall 50, a second side wall 54, and a peripheral wall 58 connecting first side wall 50 and second side wall 54. First side wall 50, second side wall 54, and peripheral wall 58 define an internal cavity 62, shown in FIG. 2, in which reel 34 and retraction mechanism 42 are housed. Referring to FIG. 1, first side wall 50 and second side wall 54 has a substantially circular profile 66. In other embodiments, the side walls may be rectangular, polygonal, or any other desired shape. Portions of the housing 18 may be co-molded or separately formed of a resilient material, such as a natural or synthetic rubber. In the illustrated construction, housing 18 is formed with housing bumpers 70 and a support leg 74 which extends from a lower portion 78 of the peripheral wall 58.

A slot 82 is defined along a forward portion 86 of peripheral wall 58. Slot 82 provides an opening in the tape measure housing which allows tape lock 46 to extend into housing 18. In addition, slot 82 provides a length sufficient to allow tape lock 46 to be moved relative to housing 18 between locked and unlocked positions.

Below the slot 82, a tape port 90 is provided in peripheral wall 58. Tape port 90 has an arcuate shape 94, corresponding to an arcuate cross-sectional profile of tape blade 14. The tape port 90 defines an opening into the housing that allows for the retraction and extension of tape blade 14 to and from the internal cavity 62 defined within housing 18.

As shown in FIGS. 1 and 2, tape measure 10 includes a finger guard assembly 98. Finger guard assembly 98 includes a guard 102 and a guard support member 106. As shown in FIG. 1, the portions of guard 102 external to housing 18 are substantially U-shaped and extend downward from housing 18. As shown in FIG. 2, when tape blade 14 is in the retracted position, a rear surface of hook assembly 26 abuts guard 102.

Referring to FIG. 3, a cross-sectional view of tape blade 14 is shown. Tape blade 14 includes an elongate core or inner layer 110 formed from a thin, elongate strip of metal material. In a specific embodiment, inner layer 110 is formed from a strip of steel material. In a specific embodiment, inner layer 110 has a thickness, T1, of less than 0.13 mm (with up to a 25% thickness variation), specifically 0.9 mm to less than 0.13 mm (with up to a 25% thickness variation), and more specifically of 0.9 mm to 0.12 mm (with up to a 25% thickness variation). Inner layer 110 may be formed in a concavo-convex configuration (as shown in FIG. 3). Inner layer 110 may be an alloyed spring steel, alloyed high strength steel, etc. In one embodiment, the steel is of a hardness between 50-54 RHC. In another embodiment, the steel is of a hardness between 45-60 RHC.

In various embodiments, inner metal layer 110 includes an upper surface that includes at least one concave section and a lower surface that includes at least one convex section. In specific embodiments, the concave and convex sections extend the entire length of the tape blade. In various embodiments, tape blade 14 includes an upper coating layer 112 coupled to (e.g., attached, bonded, glued, etc.) the concave upper surface of inner metal layer 110 and a lower coating layer 114 coupled to (e.g., attached, bonded, glued, etc.) the convex lower surface of inner metal layer 110. In general, coating layers 112 and 114 are formed from a polymer material, and in a specific embodiment, are formed from a nylon material. In specific embodiments, coating layers 112 and 114 are formed from a material that has a modulus of elasticity less than the modulus of elasticity of the metal material of inner layer 110. In specific embodiments, coating layers 112 and 114 are formed from a material that has a hardness less than the hardness of the metal material of inner layer 110. In specific embodiments, the coating layers discussed herein are formed from a nylon 12 material and/or a nylon 6/6 material.

As shown in FIG. 3, coating layer 112 has a thickness, T2, and coating layer 114 has a thickness, T3. In specific embodiments, the total thickness of the tape blade coating (i.e., the combined thickness of layers 112 and 114, T2+T3) is greater than or less than T1.

In specific embodiments, the total tape blade thickness (inclusive of all of the coating and the core layer, i.e., T1+T2+T3) is between 0.15 mm and 0.5 mm. In various embodiments, T1+T2+T3 is between 0.15 mm and 0.2 mm, and specifically is 0.18 mm. In various embodiments, T1+T2+T3 is between 0.3 mm and 0.4 mm, and specifically is 0.36 mm.

In one embodiment, coating layers 112 and 114 may be applied over the entire length of inner layer 110. In one embodiment, coating layers 112 and 114 are applied over at least 6 feet of the length of inner layer 110, specifically over at least 8 feet of the length of inner layer 110, and more specifically over at least 10 feet of the length of inner layer 110. In specific embodiments, these coating lengths are contiguous coating lengths. This may provide increased tear resistance in areas of the tape blade 14 prone to increased wear, while maintaining compactness of the tape relative to a tape blade that has the coating over the entire length. In one embodiment, coating layers 112 and 114 begin at the end of the tape blade 14 proximate the hook. In another embodiment, the coating starts at a location of the blade spaced apart from the end proximate hook assembly 26.

In some embodiments, coating layers 112 and/or 114 do not have uniform thicknesses along the width and/or length of tape blade 14. In some such embodiments, coating layers 112 and/or 114 may be applied in a pattern (e.g., a honeycomb pattern, a checkered pattern, etc.) where there are portions of thicker and thinner coating distribution across both the length and width of the tape blade 14. In such embodiments, T2 and T3 shown in FIG. 3 represent the thickness measured through the thickest portion of the coating pattern. In some such embodiments, the ranges of T2 and T3 discussed herein represent the maximum thickness of coating layers 112 and 114 at any portion along the length of tape blade 14. In some such embodiments, the combined maximum coating and blade thickness may be 0.4 mm, but in other areas along the length and width of the tape blade, the coating and blade thickness will be less (e.g., as measured at the thinner coating portions of the coating pattern). In other embodiments, the ranges of T2 and T3 discussed herein represent the average thickness of coating layers 112 and 114 measured at all of the thickest portions of the coating pattern along the length and width of tape blade 14.

Coating layers 112 and 114 may be applied as a laminate, nylon extrusion, film attached with adhesive, power/spray on coating. In one embodiment, the coating layer(s) are configured such that even if the steel core were to fracture, the coating layer is configured to contain the steel core and to maintain the integrity of the blade (e.g., the coating will tend not to tear).

In various embodiments, tape blade 14 and the tape blade edge designs discussed herein can be utilized to improve tape durability/tear resistance in tapes having a variety of lengths. In specific embodiments, the length of the tape blade is less than 50 feet or more specifically less than 40 feet. In various embodiments, the length of tape blade 14 is between 15 ft. and 40 ft., and in specific embodiments, the length of the tape blade is 35 ft., 30 ft., 25 ft., or 16 ft.

As shown in FIG. 3, inner core 110 includes a pair of opposing lateral edge surfaces 120. In the longitudinal cross-sectional view of FIG. 3, lateral edge surfaces 120 extend between the upper concave surface and the lower convex surface of inner core 110 and are contiguous with both surfaces. In addition, lateral edge surfaces 120 extend the entire longitudinal length of tape blade 14. While FIG. 3 shows coating layers 112 and 114 covering the upper and lower surfaces of tape blade 14 only, in other embodiments, a polymer coating layer surrounds/covers lateral edge surfaces 120. As will be discussed in more detail below, lateral edge surfaces 120 are configured (e.g., shaped, polished, finished, etc.) to reduce tear initiation and improve durability.

Figure 4:
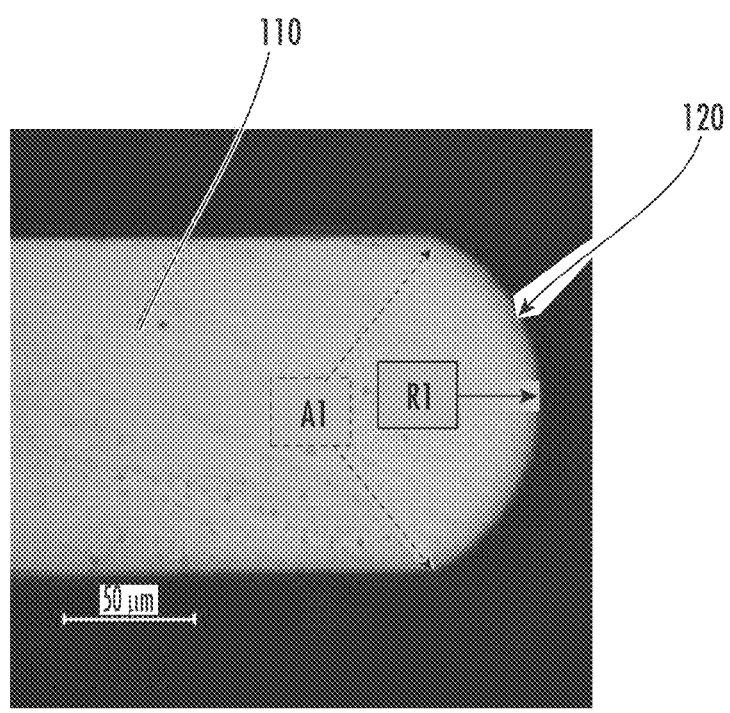
FIG. 4 is a cross-sectional micrograph image of the inner metal layer of a tape blade showing a tear resistant edge design, according to an exemplary embodiment.

Referring to FIG. 4, a detailed view of a lateral edge surface 120 of inner core 110 incorporating a tear resistant design is shown according to an exemplary embodiment. It should be understood that while FIG. 4 shows a single lateral edge surface 120, both the left and right lateral edge surfaces 120 may incorporate the various durability improving designs discussed herein. As shown in FIG. 4, lateral edge surface 120 is shaped to improve tear resistance. In particular, in contrast to typical squared tape blade edge designs, Applicant believes a curved lateral edge surface 120, such as that shown in FIG. 4 may improve tear resistance.

In various embodiments, lateral edge surfaces 120 include shaped, non-planar surface sections. In specific embodiments, the lateral edge surfaces 120 each include convex curved sections. As shown in the specific embodiment of FIG. 4, lateral edge surface 120 is a convex curved surface that extends between the opposing upper and lower surfaces of inner core 110. In particular, lateral edge surface 120 is a continuous, convex curved surface extending the entire distance between the opposing upper and lower surfaces of inner core 110. In such embodiments, the curve of surfaces 120 is continuous (e.g., non-interrupted) defining a convex curve that extends the entire distances between upper and lower surfaces of inner core 110. As will be understood, inner core 110 is formed from a contiguous, integral piece of metal which defines the upper and lower surfaces and the lateral edge surfaces 120. In some embodiments, the convex curved surface of surface 120 extends the entire length of inner core 110, and in other embodiments, the convex curved surface of surface 120 is a section extending less than the entire length of inner core 110. In some such embodiments, the convex curved section of surface 120 is located only in the first 10 feet of length from the hook end of inner core 110.

In particular embodiments, curved lateral edge surface 120 defines an arc having an angle A1. In various embodiments, angle A1 is 180 degrees or less, in specific embodiments, angle A1 is 45 degrees to 180 degrees and in even more specific embodiments A1 is 60 degrees to 120 degrees. In various embodiments, curved lateral edge surface 120 is defined by a radius of curvature R1.

Figure 5:
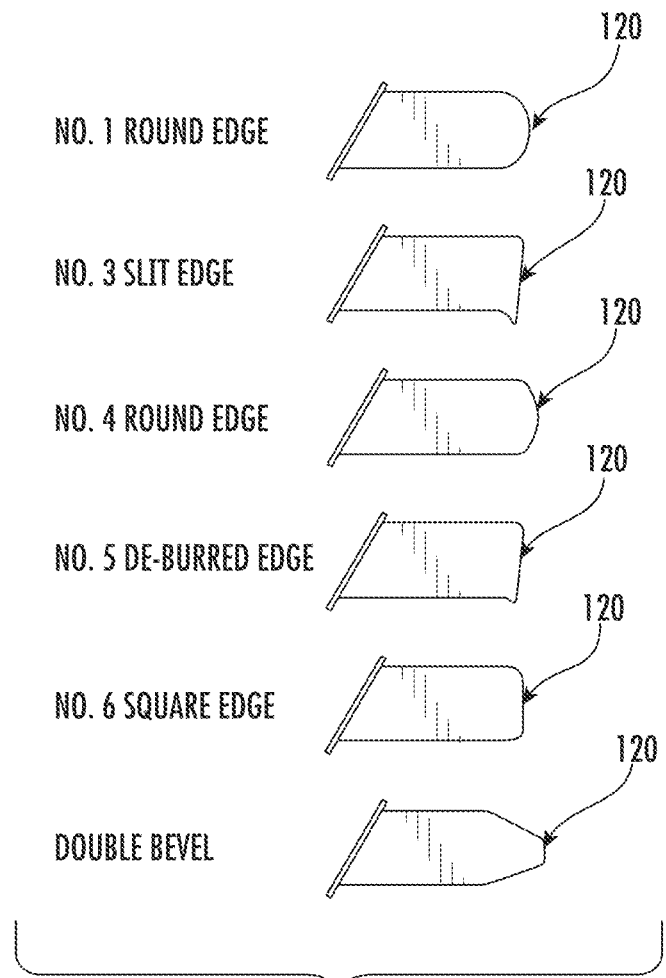
FIG. 5 shows various tape blade edge shapes that may be used in a tear resistant tape blade, according to various exemplary embodiments.

Referring to FIG. 5, Applicant believes that other shapes of lateral edge surface 120 may also improve durability of tape blade 14. In various embodiments, lateral edge surface 120 may have any of the standard American Iron and Steel Institute (AISI) edge shape profiles shown in FIG. 5.

Figure 6:
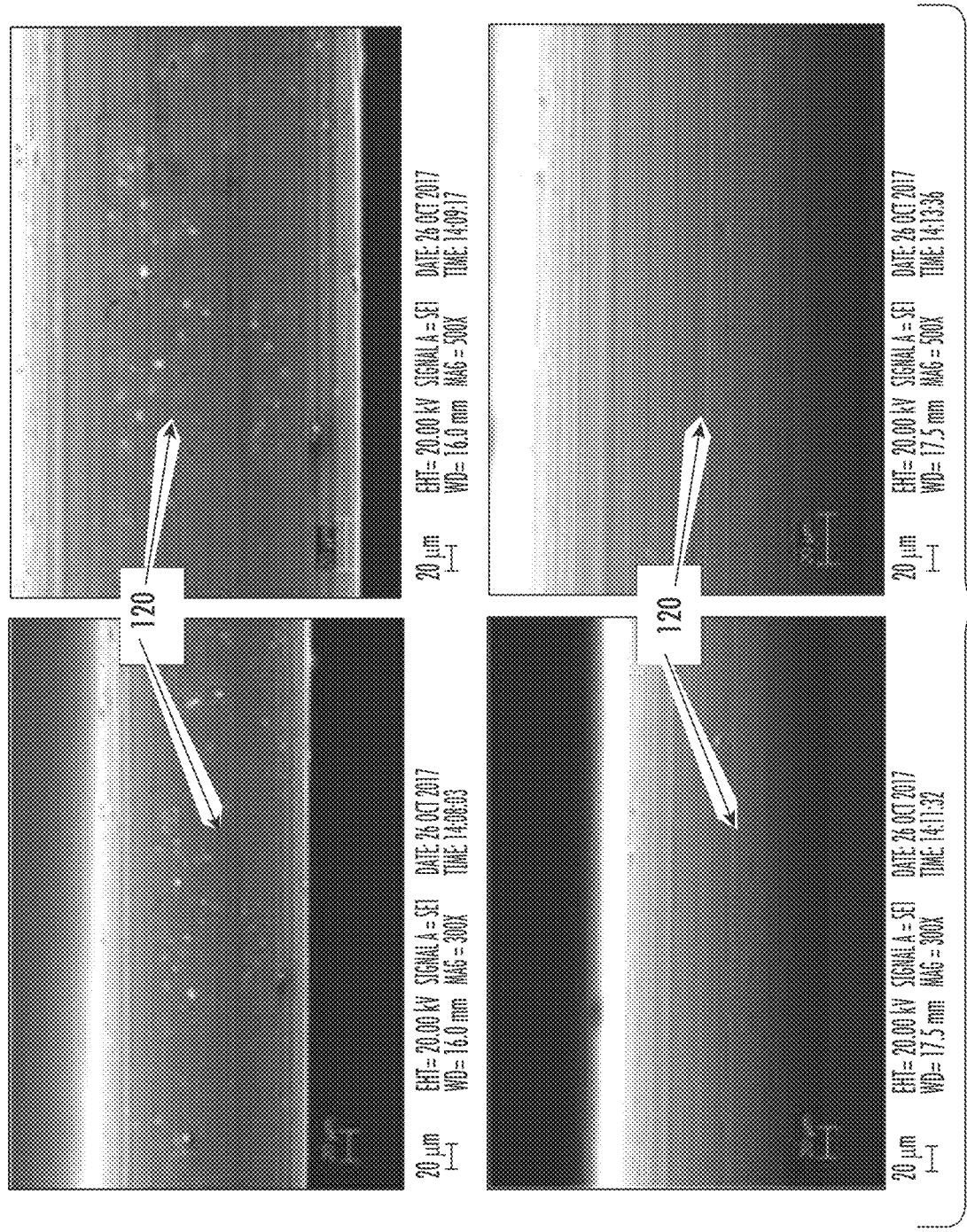
FIG. 6 shows micrograph images of a tape blade edge surface having a tear resistant edge design, according to an exemplary embodiment.

Referring to FIG. 6, instead of or in addition to the edge surface shapes discussed above regarding FIGS. 4 and 5, lateral edge surface 120 may also have a design that incorporates a surface finish that improves durability. In particular embodiments, as shown in FIG. 6, lateral edge surface 120 may be finished, polished, etc. in a manner that reduces imperfections, defects, surface roughness, etc. that Applicant believes may decrease durability of the tape blade. By comparing FIG. 6 to FIG. 8, the improved surface quality present in lateral edge surface 120 is apparent.

In various embodiments, lateral edge surface 120 includes one or more surface characteristics that Applicant believes correlates with improved durability/tear resistance. In various embodiments, lateral edge surfaces 120 have a high surface quality. As noted above, Applicant believes that by reducing the surface defects present in lateral edge surfaces 120, the durability is improved by reducing the likelihood of tear initiation during whip.

In various embodiments, the durability improving design of lateral edge surface 120 (whether the durability improving shapes of FIGS. 4 and 5 or the surface characteristic(s) of FIG. 6) extend the entire longitudinal length of tape blade 14. In other embodiments, the durability improving design of lateral edge surface 120 (whether the durability improving shapes of FIGS. 4 and 5 or the surface characteristic(s) of FIG. 6) extend a portion of the longitudinal length of tape blade 14 in regions more susceptible to tearing. In specific embodiments, the durability improving design of lateral edge surface 120 (whether the durability improving shapes of FIGS. 4 and 5 or the surface characteristic(s) of FIG. 6) extend for the first 10 feet from hook assembly 26, specifically for the first six feet from hook assembly 26.

In various embodiments, the edge shapes and/or surface finishes discussed herein may be formed via a variety of methods. In various embodiments, the edge shapes and/or surface finishes discussed herein are formed using one or more of grinding, polishing, compressing, molding, melting, or other suitable means. In a specific embodiment, lateral edge surface 120 are produced via a skiving edge forming process.

In specific embodiments, at least a section of one or both of lateral edge surfaces 120 is polished such that the number of surface defects on the lateral edge surfaces of the metal core is less than the number of surface defects on the unpolished upper and/or lower surfaces of the metal core 110. In specific embodiments, the polishing of lateral edge surfaces 120 reduces the number of surface defects such that an average number of surface defects per unit of area (e.g., per $mm^2$ or per $cm^2$) of lateral edge surface(s) 120 is less than an average number of surface defects per the unit of area of the upper surface of the metal core 110.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
    a housing:
    a reel rotatably mounted within the housing;
    an elongate blade wound around the reel, the elongate blade comprising:
        an elongate metal core having an upper surface, a lower surface, a first lateral edge surface extending between the upper and lower surfaces of the elongate metal core and a second lateral edge surface opposite the first lateral edge surface and extending between the upper and lower surfaces of the elongate metal core;
        wherein the upper surface of the elongate metal core includes a concave curved section;
        wherein the lower surface of the elongate metal core includes a convex curved section;
        wherein the first lateral edge surface includes a convex curved section;
        wherein the second lateral edge surface includes a convex curved section;
        wherein the convex curved section of the first lateral edge surface defines an arc having an angle of 60 to 120 degrees, wherein the convex curved section of the second lateral edge surface defines an arc having an angle of 60 to 120 degrees; and
    a retraction mechanism coupled to the reel configured to drive rewinding of the elongate blade on to the reel.

2. The tape measure of claim 1, wherein the convex curved section of the first lateral edge surface is a continuous curved section extending from the upper surface to the lower surface of the elongate metal core, wherein the convex curved section of the second lateral edge surface is a continuous curved section extending from the upper surface to the lower surface of the elongate metal core.

3. The tape measure of claim 2, wherein the convex curved section of the first lateral edge surface extends lengthwise an entire length of the elongate metal core, wherein the convex curved section of the second lateral edge surface extends lengthwise the entire length of the elongate metal core.

4. The tape measure of claim 1, wherein the elongate blade further comprises a polymer coating coupled to the elongate metal core.

5. The tape measure of claim 4, wherein the polymer coating is located both above the upper surface of the elongate metal core and below the lower surface of the elongate metal core.

6. The tape measure of claim 5, wherein the polymer coating does not cover the first lateral edge surface or the second lateral edge surface.

7. The tape measure of claim 1, wherein a section of the first lateral edge surface is polished such that an average number of surface defects per unit of area of the first lateral edge surface is less than an average number of surface defects per the unit of area of the upper surface of the elongate metal core.

8. The tape measure of claim 7, wherein the polished section of the first lateral edge surface is located only within the first 10 feet of length of the elongate metal core adjacent to a hook assembly coupled to an outer end of the elongate blade.

9. The tape measure of claim 1, wherein the retraction mechanism comprises a spring coupled to the reel such that when the elongate blade is unwound from the reel to extend from the housing the spring stores energy and the spring releases energy driving rewinding of the elongate blade on to the reel.

10. The tape measure of claim 9, wherein the elongate metal core has a thickness, T1, measured between the upper surface and the lower surface, wherein T1 is between 0.09 mm and 0.2 mm.

11. A tape measure comprising:
a housing;
a reel rotatably mounted within the housing;
an elongate metal tape blade core wound on the reel, the elongate metal tape blade core comprising:
an upper surface;
a lower surface;
a first lateral edge surface extending between the upper and lower surfaces of the elongate metal core; and
a second lateral edge surface opposite the first lateral edge surface and extending between the upper and lower surfaces of the elongate metal tape blade core;
wherein the first lateral edge surface of the elongate metal tape blade core include a curved longitudinal cross-sectional shape located between the upper surface and the lower surface;
wherein the second lateral edge surface of the elongate metal tape blade core include a curved longitudinal cross-sectional shape located between the upper surface and the lower surface; and
a retraction mechanism coupled to the reel configured to drive rewinding of the elongate metal tape blade core on to the reel.

12. The tape measure of claim 11 further comprising:
a coating layer coupled to the elongate metal tape blade core;
wherein the upper surface of the elongate metal tape blade core includes a concave curved section;
wherein the lower surface of the elongate metal tape blade core includes a convex curved section.

13. The tape measure of claim 12, wherein the coating layer is a polymer coating located both above the upper surface of the elongate metal tape blade core and below the lower surface of the elongate metal tape blade core.

14. The tape measure of claim 11, wherein the curved longitudinal cross-sectional shape of the first lateral edge surface is a continuous curved section extending from the upper surface to the lower surface of the elongate metal tape blade core, wherein the curved longitudinal cross-sectional shape of the second lateral edge surface is a continuous curved section extending from the upper surface to the lower surface of the elongate metal tape blade core.

15. The tape measure of claim 14, wherein the curved longitudinal cross-sectional shape of the first lateral edge surface extends lengthwise an entire length of the elongate metal tape blade core, wherein the curved longitudinal cross-sectional shape of the second lateral edge surface extends lengthwise the entire length of the elongate metal tape blade core.

16. The tape measure of claim 11, wherein the curved longitudinal cross-sectional shape of the first lateral edge surface defines an arc having an angle 45 degrees to 180 degrees, wherein curved longitudinal cross-sectional shape of the second lateral edge surface defines an arc having angle 45 degrees to 180 degrees.

17. A tape measure comprising:
a housing:
a reel rotatably mounted within the housing;
an elongate tape measure blade wound around the reel comprising an elongate metal core, the elongate metal core comprising:
an upper surface;
a lower surface;
a first lateral edge surface extending between the upper and lower surfaces of the elongate metal core; and
a second lateral edge surface opposite the first lateral edge surface and extending between the upper and lower surfaces of the elongate metal core;
wherein the first lateral edge surface includes a surface finish such that a characteristic of the first lateral edge surface is different than a characteristic of the of the upper surface of the elongate metal core;
wherein the second lateral edge surface includes a surface finish such that a characteristic of the second lateral edge surface is different than a characteristic of the of the upper surface of the elongate metal core; and
a retraction mechanism coupled to the reel configured to drive rewinding of the elongate tape measure blade on to the reel.

18. The tape measure of claim 17, further comprising a hook assembly coupled to an outer end of the elongate tape measure blade, wherein the surface finishes of the first lateral edge surface and of the second lateral edge surface are located only within the first 10 feet of length of the elongate tape measure blade adjacent to the hook assembly.

19. The tape measure of claim 17, wherein the upper surface of the elongate metal core includes a concave curved section, wherein the lower surface of the elongate metal core includes a convex curved section, wherein the first lateral edge surface includes a convex curved section, wherein the second lateral edge surface includes a convex curved section.

20. The tape measure of claim 17, further comprising a polymer layer coupled to the elongate metal core, and a hook assembly coupled to an outer end of the elongate tape measure blade.

* * * * *